United States Patent [19]

Sakurai et al.

[11] Patent Number: 5,526,698
[45] Date of Patent: Jun. 18, 1996

[54] CAPACITANCE TYPE ELECTROMAGNETIC FLOWMETER

[75] Inventors: Yutaka Sakurai; Tamio Ishihara, both of Katsuta, Japan

[73] Assignee: Hitachi, Ltd., Tokyo, Japan

[21] Appl. No.: 127,831

[22] Filed: Sep. 28, 1993

[30] Foreign Application Priority Data

Sep. 30, 1992 [JP] Japan .................... 4-261077

[51] Int. Cl.$^6$ ....................................... G01F 1/58
[52] U.S. Cl. .................... 73/861.12; 73/861.08
[58] Field of Search .................... 73/861.08, 861.11, 73/861.12, 861.17, 861.18, 201

[56] References Cited

U.S. PATENT DOCUMENTS

| | | | |
|---|---|---|---|
| 3,610,040 | 10/1971 | Wada | 73/861.12 |
| 4,539,853 | 9/1985 | Appel et al. | 73/861.12 |
| 4,614,121 | 9/1986 | Hansen et al. | 73/861.12 |
| 4,631,969 | 12/1986 | Schmoock | 73/861.12 |
| 4,641,536 | 2/1987 | Jacobsen et al. | 73/861.12 |
| 4,658,652 | 4/1987 | Pilone et al. | 73/861.12 |
| 4,914,950 | 4/1990 | Uematsu et al. | 73/861.12 |
| 5,307,687 | 5/1994 | Arai et al. | 73/861.12 |
| 5,385,055 | 1/1995 | Kubota et al. | 73/861.12 |
| 5,458,003 | 10/1995 | Ishihara et al. | 73/861.12 |

FOREIGN PATENT DOCUMENTS

| | | | |
|---|---|---|---|
| 2160658 | 12/1985 | United Kingdom | 73/861.12 |
| 0003764 | 9/1984 | WIPO | 73/861.12 |

*Primary Examiner*—Richard Chilcot
*Assistant Examiner*—Elizabeth L. Dougherty
*Attorney, Agent, or Firm*—Kenyon & Kenyon

[57] ABSTRACT

A capacitance type electromagnetic flowmeter whose output is relatively free from fluctuations caused by external vibrations has a flow tube supported in a casing member by means of members having elasticity and viscosity (e.g., O-rings). Magnetic parts such as coils and a core are fixed to the casing member so as to define a space therewith, and protective rings are kept liquid-tight with respect to the flow tube by O-rings interposed therebetween. The equivalent mass of the flowmeter section vibrating integrally with the flow tube is reduced to increase the resonance frequency. Further, since the flow tube is insulated from vibrations of the protective rings, the flow is less subject to vibrations, thereby decreasing fluctuations in output due to external vibrations.

27 Claims, 5 Drawing Sheets

CAPACITANCE TYPE ELECTROMAGNETIC FLOWMETER

BACKGROUND OF THE INVENTION

1. Field of the Invention

The present invention relates to a capacitance type electromagnetic flowmeter and, in particular, to the structure of a joint section between a flow tube and a casing member encasing the same in a capacitance type electromagnetic flowmeter.

2. Description of the Prior Art

Hitherto, a variety of patent applications have been filed regarding electromagnetic flowmeters and, in particular, capacitance type electromagnetic flowmeters, a typical example of which is shown in U.S. Pat. No. 4,539,853.

FIG. 2 is a side view of the prior-art example mentioned above.

Referring to the drawing, a flange section 31a, 31b is provided at either end of a flow tube 31 formed of a ceramic material. The flow tube 31 is encased in a casing member 32. The outer periphery of each flange section 31a, 31b is fitted into the casing member 32 and firmly joined thereto by metallic bonding, resin adhesion or the like. A pair of coils 33 and a core 34 for generating a magnetic field in the flow tube are firmly attached to the cylindrical outer peripheral surface of the flow tube 31. Further, a pair of flow electrodes are provided on the outer peripheral surface of the flow tube 31 in such a way as to be positioned parallel to the magnetic flux emitted from the coils 33. Further, a shield electrode (not shown) is provided in such a way as to surround the flow electrodes. Protective rings 6a and 6b are respectively attached to the end surfaces of the flange sections 31a and 31b of the flow tube 31 via first gaskets 5a and 5b, respectively. The protective rings 6a and 6b serve to protect the flow tube 31 and to set the electric potential of the liquid portion near the protective rings to the ground potential. Second gaskets 7a and 7b are attached to the respective reverse or outer sides of the protective rings 6a and 6b. The gaskets 5a, 5b, 7a and 7b are mainly formed of a highly waterproof sealing material such as polytetrafluoroetylene. The electromagnetic flowmeter of the described structure is interposed between flanges 8a and 8b of a process piping and fastened thereto by bolts 9 so as to be held in a liquid-tight fashion by the process piping.

Due to the provision of an electrode section which is relatively free from the influence of insulating extraneous matter, the capacitance type electromagnetic flowmeter described above has excellent features which are not to be expected from electrode type electromagnetic flowmeters. For example, the main cause of flow liquid leakage is eliminated in the above capacitance type electromagnetic flowmeter. On the other hand, this electromagnetic flowmeter has a problem that its output is liable to fluctuate depending upon the magnitude of vibrations propagated thereto from the outside, for example, piping vibrations. Such a fluctuation in output is caused as follows: when the flow tube is caused to vibrate by external vibrations, a vibration having a specific frequency causes the electromagnetic flowmeter to resonate to generate a distortion between the outer peripheral ceramic surface of the flow tube and the flow electrodes provided on the ceramic surface. This distortion causes a microphone noise to be generated in the electrodes.

SUMMARY OF THE INVENTION

The present invention provides a capacitance type electromagnetic flowmeter in which output fluctuations due to external vibrations are reduced, thereby eliminating the above problem in the prior art.

The present invention provides a capacitance type electromagnetic flowmeter comprising: a flow tube which is provided in a casing member and through which a fluid flows; magnetic field applying means for applying a magnetic field of an arbitrary magnitude to the fluid flow; and electrodes, wherein, to prevent the flow tube from contacting other components, members having elasticity and viscosity are wound around the outer periphery of the flow tube so that the flow tube is supported in the casing member by means of the abovementioned members in such a manner as to be kept out of contact with the casing member.

Members having elasticity and viscosity may be interposed between the joint surfaces of a process piping, through which the fluid flows, and both ends of the flow tube, whereby the flow tube and the process piping are kept out of contact with each other.

Further, the above-mentioned members having elasticity and viscosity may be provided between the outer peripheral surface of the flow tube and the casing member, and between both ends of the flow tube and the joint surfaces of the process piping, thereby keeping the flow tube out of contact with the casing member and the process piping.

The magnetic field applying means may be fixed to the casing member, and the magnetic field generating means and the flow tube may be kept out of contact with each other.

As described above, since the members having elasticity and viscosity are wound around the outer periphery of the flow tube and the flow tube is supported in the casing member by means of these members such that the flow tube and the casing member are kept out of contact with each other, the propagation of vibration from the casing member can be absorbed by these members, thus making it possible to insulate the flow tube from the casing member in terms of vibrations. Due to this construction, the mass of the flow tube vibration system, which vibrates integrally with the flow tube, can be reduced, so that the resonance frequency of this vibration system increases, thereby making it possible to restrain vibrations of the flow tube.

By adopting the construction in which members having elasticity and viscosity are held between the ends of the flow tube and the joint surfaces of the process piping through which the fluid flows, the propagation of vibration from the process piping can be absorbed by the above members and, at the same time, the casing member can be insulated from the flow tube in terms of vibrations, so that the mass of the flowmeter portion vibrating equivalently with the flow tube is reduced, thereby making it possible to increase the resonance frequency.

By adopting the construction in which the above-mentioned members are provided between the outer peripheral surface of the flow tube and the casing member and between the ends of the flow tube and the joint surfaces of the process piping while keeping the flow tube out of contact with the casing member and the process piping, the propagation of vibration from the process piping and the casing member can be absorbed by the above members, and the casing member and the process piping can be insulated from each other in terms of vibrations, so that the mass of the flowmeter portion vibrating equivalently with the flow tube can be further reduced, thereby making it possible to increase the resonance frequency.

Further, by adopting the construction in which the magnetic field generating means is secured to the casing member and kept out of contact with the flow tube, the magnetic field generating means can be insulated from the flow tube in terms of vibrations, so that the mass of the flowmeter portion equivalently vibrating with the flow tube is still further reduced, thereby making it possible to further increase the resonance frequency.

DETAILED DESCRIPTION OF THE PREFERRED EMBODIMENTS

Figure 1:
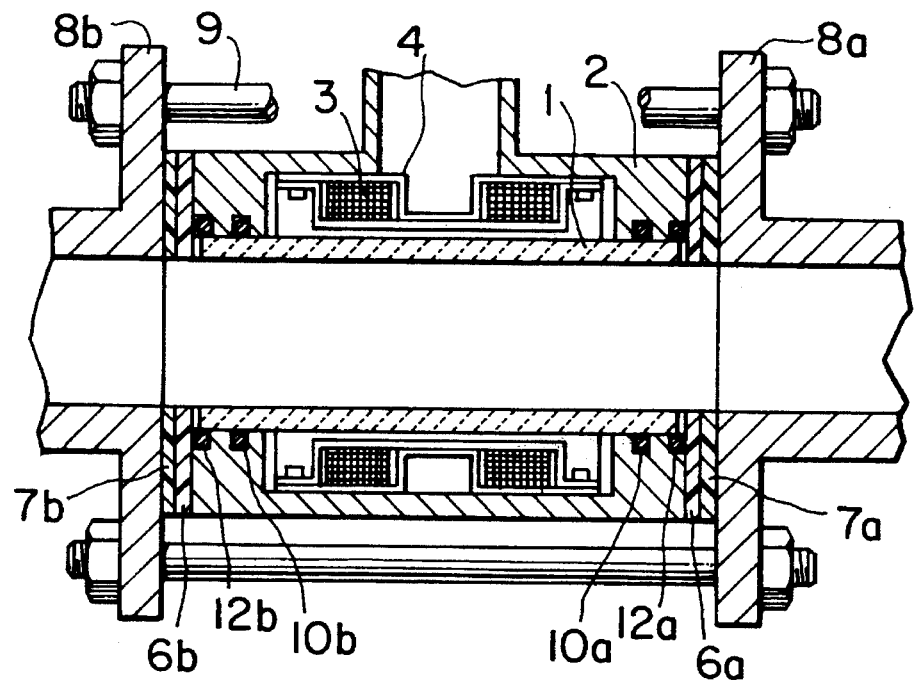
FIG. 1 shows a capacitance type electromagnetic flowmeter according to the present invention installed in a process piping.
Figure 2:
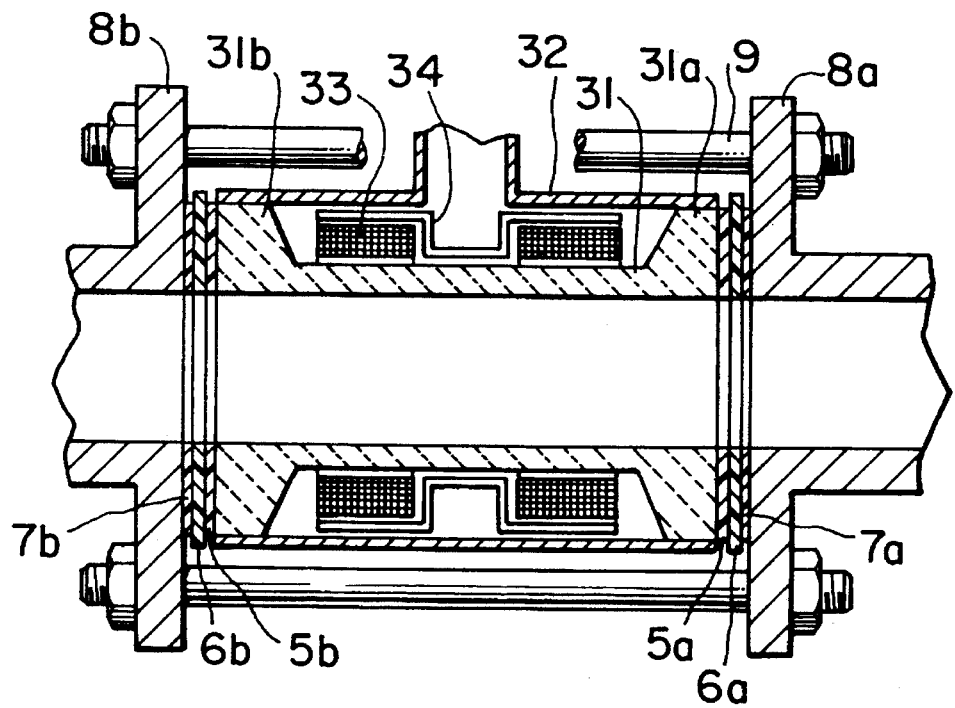
FIG. 2 shows a conventional capacitance type electromagnetic flowmeter installed in a process piping.

The present invention will now be described with reference to an embodiment shown in FIGS. 1, 3 and 4. Referring to FIG. 1, a flow tube 1, made of a ceramic material, is formed as a straight pipe having no flange. The flow tube 1 is secured in position between process piping flanges 8a and 8b by means of bolts 9. A casing member 2 and protective rings 6a and 6b are firmly attached to each other. Referring to the detailed view of FIG. 4, each end portion of the flow tube 1 shown in the drawing is supported in a liquid-tight manner by the casing member 2 via first and second O-rings 10a and 12a mounted on the end portion of the outer periphery of the flow tube. The second O-ring 12a is also held by the protective ring 6a in a liquid-tight manner. A gasket 7a is interposed between the protective ring 6a and the process piping flange 8a so as to keep the interface between the protective ring 6a and the process piping flange 8a liquid-tight. The second O-ring 12a is made of a material having elasticity and viscosity and, due to its flexibility, is capable of being deformed by the pressing force applied from the protective ring 6a at the time of attachment of the flow tube 1 and is closely fitted to a groove in the casing member 2 and the flow tube 1. A gap which is narrower than the diameter of the O-ring 12a is provided between the flow tube 1 and the protective ring 6a.

Figure 3:
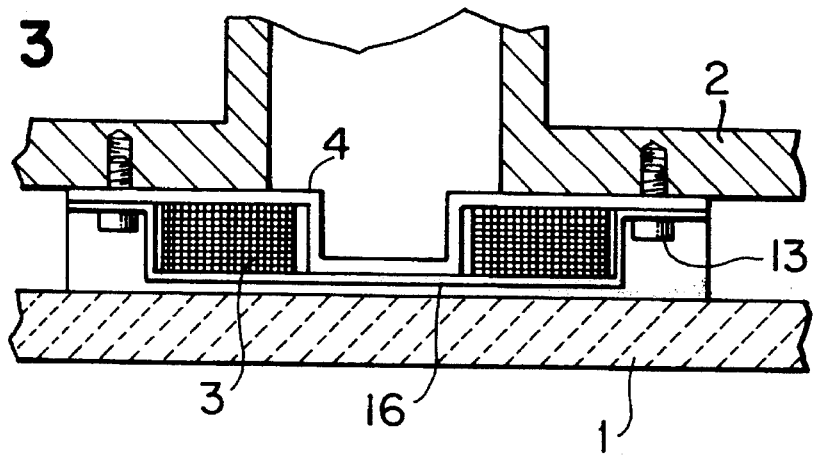
FIG. 3 is an enlarged view of the coil mounting section of the capacitance type electromagnetic flowmeter shown in FIG. 1.
Figure 4:
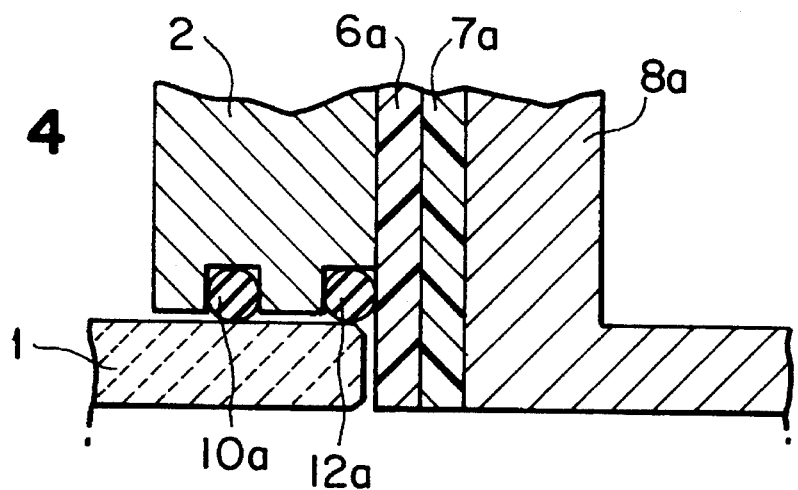
FIG. 4 is an enlarged view of a flow tube holding section of the capacitance type electromagnetic flowmeter shown in FIG. 1.

FIG. 3 is a detailed view of a flowmeter section where coils 3 and a core 4 are mounted. The coils 3, which apply a magnetic field to the fluid flow, are held between the core 4 and a holding member 16. With the coils 3 thus held, the core 4 and the holding member 16 are secured to the casing member 2, thereby securing the coil 3 in position between the two members. The core 4 and the holding member 16 are secured to the casing member 2 by means of screws 13. A gap exists between the holding member 16 and the flow tube 1, thus keeping them out of contact with each other.

Though not shown in the drawings, examples of the electrodes which can be used in the capacitance type electromagnetic flowmeter of the present invention include an electrode formed, as shown in U.S. Pat. No. 4,539,853, on the outer peripheral surface of the flow tube 1 to extend parallel to a line connecting two coils 3 and provided with a shield electrode around it, an electrode which is formed in the ceramic material of the flow tube 1, and an electrode which is formed on the inner peripheral surface of the flow tube and has a lining thereon.

Figure 5:
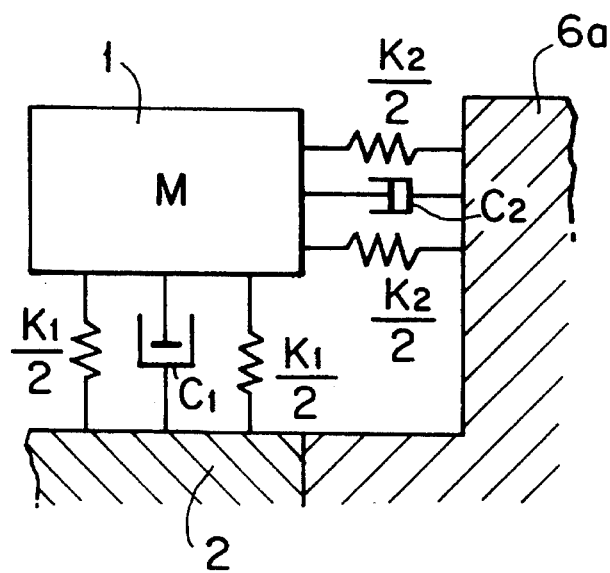
FIG. 5 is an equivalence diagram of the vibration system of the capacitance type electromagnetic flowmeter shown in FIG. 1.

The operation of the above-described capacitance type electromagnetic flowmeter when an external vibration is applied thereto will be explained. The external vibration is propagated through the process piping flanges 8a and 8b and the gaskets 7a and 7b to the protective rings 6a and 6b. The vibration is propagated to the casing member 2, which is in contact with the protective rings 6a and 6b, and partly propagated through the first and second O-rings 10a, 10b and 12a and 12b. Since the flow tube 1 is viscoelastically supported by the casing member 2 and the protective rings 6a and 6b due to the presence of the O-rings, a vibration insulating system is obtained which is composed of a damper (a viscous substance), as equivalently shown in FIG. 5, which is an equivalence diagram of the vibration system of the capacitance type electromagnetic flowmeter of FIG. 1. In FIGS. 1 and 5, the same components are indicated by the same reference numerals. Referring to FIG. 5, K1 indicates the elastic coefficient of the flowmeter portion between the flow tube 1 and the casing member, that is, the elastic coefficient of the first and second O-rings 10a, 10b, 12a and 12b. C1 indicates the coefficient of viscosity thereof. Similarly, K2 indicates the elastic coefficient of the flowmeter portion between the flow tube 1 and the protective rings 6a and 6b, that is, the elastic coefficient of the second O-rings 12a and 12b. C2 indicates the coefficient of viscosity thereof.

Thus, the flowmeter sections between the flow tube 1 and the protective rings 6a and 6b and between the flow tube 1 and the casing member 2 constitute a vibration insulating system, so that any vibration generated in the protective rings 6a and 6b and the casing member 2 is only partially propagated to the flow tube.

Any distortion generated in the flow tube 1 and, in particular, on the flow electrodes or in the vicinity thereof, causes a fluctuation in output in correspondence with a time differential. The fluctuation in output generated by such a distortion is attributable to a microphone noise, which is described in U.S. Pat. No. 4,539,853 referred to above.

Next, examples of O-ring installation will be described in detail with reference to enlarged structural views of the flow tube holding section shown in FIGS. 6 through 9.

Figure 6:
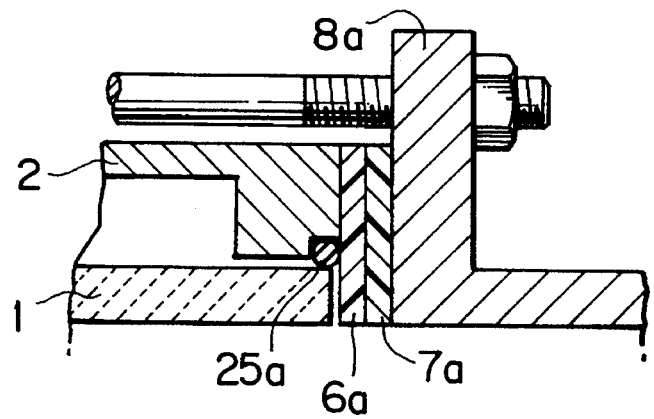
FIG. 6 shows a first example of O-ring installation in a flow tube holding section of the capacitance type electromagnetic flowmeter according to the present invention.

In the example shown in FIG. 6, the same construction as that of the embodiment shown in FIG. 1 is adopted. The example differs from FIG. 1 only in that one kind of O-rings are adopted. That is, the vibration absorption between the flow tube 1 and the casing member 2 is effected with a pair of O-rings 25a alone. Due to this structure, a simplification in structure can be attained as compared with the embodiment shown in FIG. 1.

Figure 7:
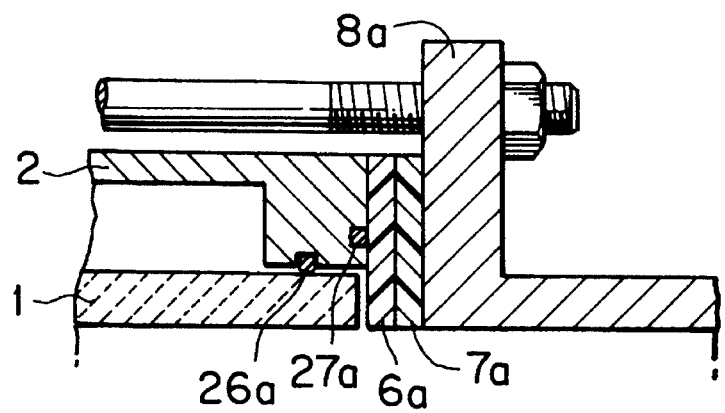
FIG. 7 shows a second example of O-ring installation in the flow tube holding section of the capacitance type electromagnetic flowmeter according to the present invention.

In the example shown in FIG. 7, the vibration absorption between the flow tube 1 and the casing member 2 is effected through an O-ring 26a, and the liquid-tightness between the casing member 2 and the protective ring 6a is maintained by an O-ring 27a.

Figure 8:
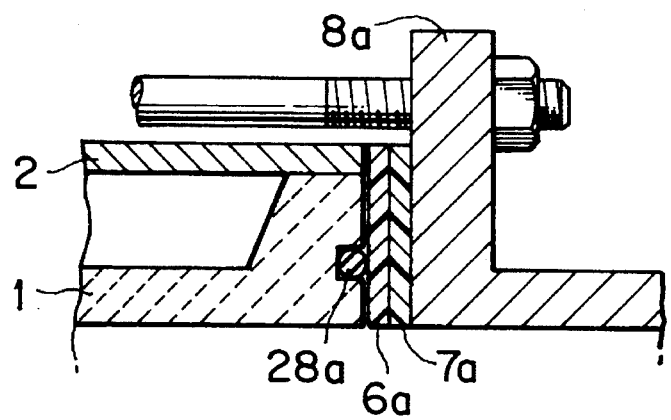
FIG. 8 shows a third example of O-ring installation in the flow tube holding section of the capacitance type electromagnetic flowmeter according to the present invention.

In the O-ring installation example of FIG. 8, the insulation in terms of vibrations is effected only between the flow tube and the process piping. As shown in the drawing, an O-ring 28a is arranged between the flow tube 1, which is provided with a groove, and the protective ring 6a, whereby any vibration from the process piping 8a is absorbed and, at the same time, the liquid-tightness between the flow tube 1 and the protective ring 6a is maintained.

Figure 9:
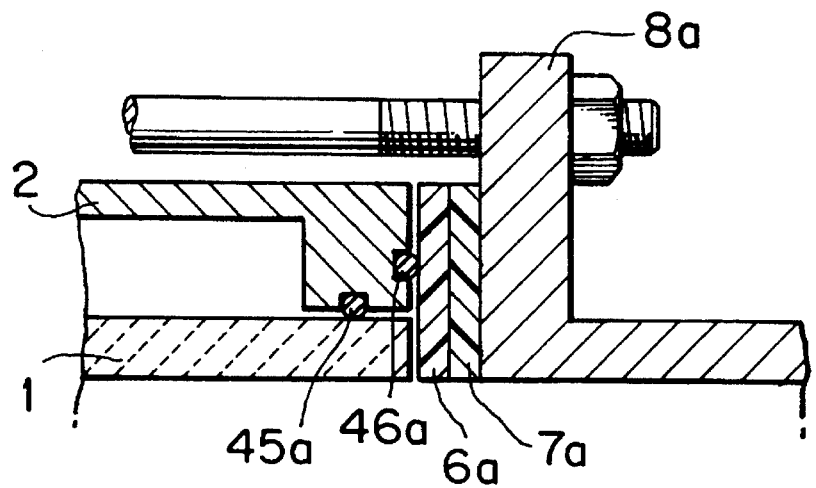
FIG. 9 shows a fourth example of O-ring installation in the flow tube holding section of the capacitance type electromagnetic flowmeter according to the present invention.

In the example shown in FIG. 9, the vibration propagating system is divided into two stages in order to attain a special reduction in vibrations from the process piping flange 8a. That is, any vibration from the process piping flange 8a, which is propagated through the protective ring 6a and the gasket 7a, is absorbed in two stages, i.e., by O-rings 46a and 45a, thereby further enhancing the vibration absorbing effect.

Figure 10:
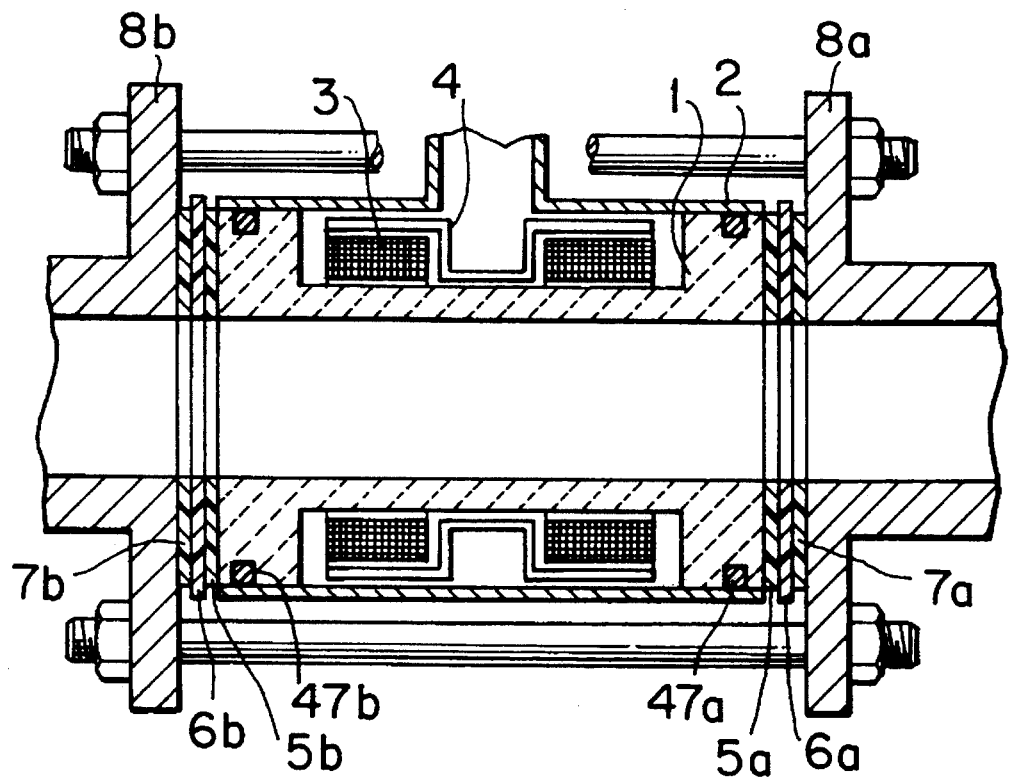
FIG. 10 shows an example of O-ring installation against vibrations from the casing member of the capacitance type electromagnetic flowmeter according to the present invention.
Figure 11:
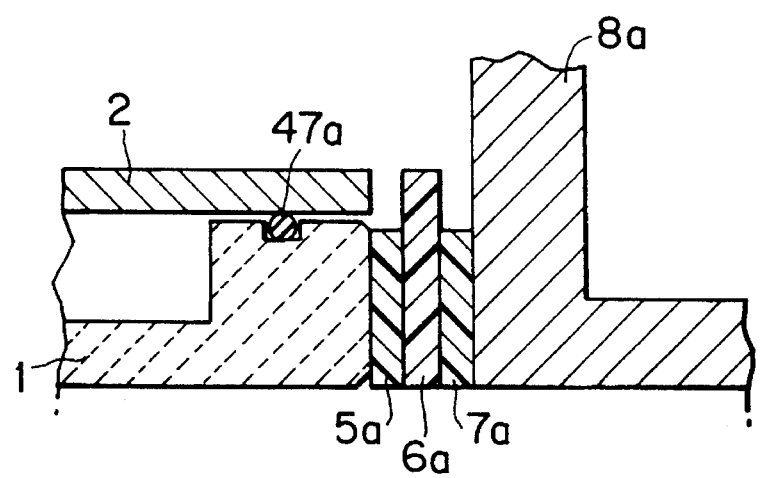
FIG. 11 is an enlarged view of a flow tube holding section of the capacitance type electromagnetic flowmeter shown in FIG. 10.

In the O-ring installation example shown in FIG. 10, the influence of vibrations from the casing member 2 is especially taken into consideration. In this example, the flow tube 1 is fastened to the process piping flanges 8a and 8b via first gaskets 5a and 5b, protective rings 6a and 6b, and second gaskets 7a and 7b. As will be seen also from the enlarged view of FIG. 11, the flow tube.1 and the casing member 2 are held viscoelastically and out of contact with each other by O-rings 47a and 47b. Due to this construction, the flow tube is insulated in terms of vibrations from the casing member 2, which has a large mass, so that the resonance frequency of the flow tube is increased, thereby suppressing the occurrence of resonance. Further, by adopting a construction in which, as shown in FIG. 3, the coils 3 and the core 4 are secured to the casing member 2, the flow tube 1 is kept out of contact with them, thereby further reducing the mass of the vibration system of the flow tube 1. As a result, the resonance frequency of the vibration system of the flow tube 1 is further increased to suppress the occurrence of resonance and, at the same time, the force applied to the flow tube 1 upon occurrence of vibration is reduced, thereby reducing the distortion generated.

Figure 12:
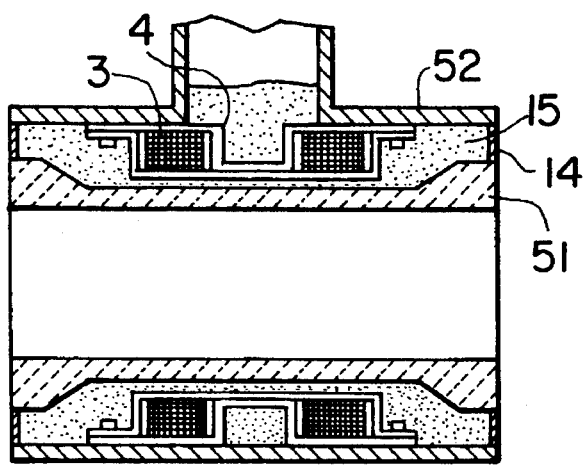
FIG. 12 shows an embodiment in which cylindrical members are installed for the purpose of holding the flow tube of the capacitance type electromagnetic flowmeter according to the present invention.
Figure 13:
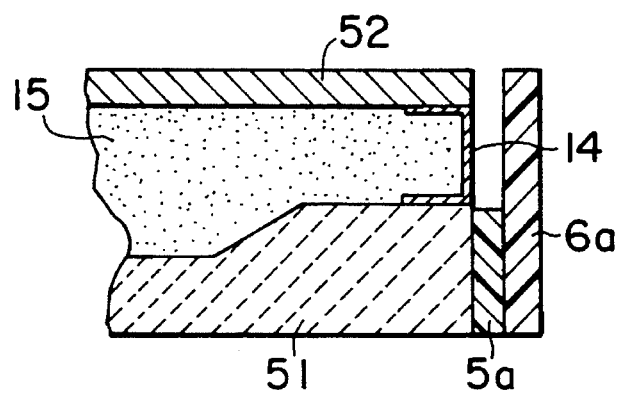
FIG. 13 is an enlarged view of the flow tube holding section of the capacitance type electromagnetic flowmeter shown in FIG. 12.

Next, an embodiment in which a cylindrical member is employed instead of an O-ring, that is, an annular member having elasticity and viscosity, will be described in detail with reference to FIGS. 12 and 13.

A cylindrical elastic member 14 is arranged on each end section of the outer peripheral surface of a flow tube 51. As shown in the enlarged view of FIG. 13, the member 14 has a U-shaped section, supporting the flow tube 51 on a casing member 52. The member 14 may alternatively be a diaphragm having a corrugated section. It is also possible to form the member in a cylindrical configuration by filling the space between the flow tube 51 and the casing member 52 with a viscous material 15 consisting of silicone rubber or the like. By forming the cylindrical vibration insulating system as described above, it is possible to obtain the same effect as that obtainable from the case where the flow tube is supported by O-rings.

Due to the above-described constructions, the present invention provides the following advantages:

By adopting the construction in which members absorbing vibrations are provided between the flow tube and the casing member or between the flow tube and the process piping, the propagation of vibrations from the process piping, etc. can be reduced to decrease the flow errors in the electromagnetic flowmeter due to external vibrations.

By providing a gap between the magnetic field generating element and the flow tube, it is possible, as in the above case, to decrease the flow errors in the electromagnetic flowmeter due to external vibrations.

Further, by adopting a construction in which the above two features are combined, the propagation of external vibrations can be further reduced, with the result that errors in the electromagnetic flowmeter can be further decreased.

What is claimed is:

1. A capacitance type electromagnetic flowmeter comprising:

a flow tube which is arranged in a casing member and through which a fluid flows;

magnetic field applying means for applying a magnetic field to said fluid flow; and electrodes connected to said flow tube and disposed out of contact with said fluid flow, wherein said flow tube is supported in said casing member in a non-contacting relationship thereto by members having elasticity and viscosity, wherein the non-contacting relationship of the flow tube and the casing member prevents external vibration from being transmitted to the flow tube.

2. A capacitance type electromagnetic flowmeter according to claim 1, wherein said magnetic field applying means is secured to said casing member and kept out of contact with said flow tube.

3. A capacitance type electromagnetic flowmeter according to claim 2, wherein said members each have one of annular and cylindrical shapes.

4. A capacitance type electromagnetic flowmeter according to claim 3, wherein said flow tube is supported in said casing member in a liquid-tight and non-contact relationship therewith by means of at least two annular members so as to define a gap therebetween.

5. A capacitance type electromagnetic flowmeter according to claim 4, wherein said at least two annular members are O-rings.

6. A capacitance type electromagnetic flowmeter according to claim 5, wherein grooves having the same circumferential length as said annular members are provided in said casing member.

7. A capacitance type electromagnetic flowmeter comprising:

a flow tube which is inserted in a gap in a process piping and through which a fluid from said process piping flows;

magnetic field generating means for applying a magnetic field to said fluid flow; and electrodes connected to said flow tube and kept out of contact with said fluid flow, wherein members having elasticity and viscosity are arranged between said process piping and said flow tube so that said flow tube is kept out of contact with any member disposed in an adjacent relationship to said flow tube in an axial direction thereof, and wherein the flow tube is in a non-contacting relationship with the casing member, wherein the non-contacting relationship of the flow tube and the casing member prevents external vibration from being transmitted to the flow tube.

8. A capacitance type electromagnetic flowmeter according to claim 7, further comprising protective rings disposed between said process piping and said flow tube.

9. A capacitance type electromagnetic flowmeter according to claim 8, wherein said members having elasticity and viscosity are O-rings.

10. A capacitance type electromagnetic flowmeter comprising:

a flow tube which is inserted in a gap in a process piping and arranged in a casing member and through which a flow fluid flows;

magnetic field applying means for applying a magnetic field to said fluid flow; and electrodes connected to said flow tube and kept out of contact with said fluid flow, wherein members having elasticity and viscosity are arranged between said flow tube and said casing member and between said flow tube and said process piping so that said flow tube is kept out of contact with said casing member and with any member disposed in an adjacent relationship to said flow tube in an axial direction thereof, wherein the flow tube is in a non-contacting relationship with the casing member, wherein the non-contacting relationship of the flow tube and the casing member prevents external vibration from being transmitted to the flow tube.

11. A capacitance type electromagnetic flowmeter according to claim 10, further comprising protective rings provided between said process piping and said flow tube and between said casing member and said process piping.

12. A capacitance type electromagnetic flowmeter according to claim 11, wherein said magnetic field applying means is secured to said casing member and kept out of contact with said flow tube.

13. A capacitance type electromagnetic flowmeter according to claim 12, wherein said members each have one of annular and cylindrical shapes.

14. A capacitance type electromagnetic flowmeter according to claim 13, wherein said casing member, said flow tube and one of said protective rings and said process piping are kept out of contact with each other by means of at least two of said members having elasticity and viscosity so as to define gaps therebetween.

15. A capacitance type electromagnetic flowmeter according to claim 14, wherein said flow tube and said protective rings are held in a liquid-tight and non-contacting relationship with each other by means of at least two of said members having elasticity and viscosity to define spaces therebetween.

16. A capacitance type electromagnetic flowmeter according to claim 15, wherein said members are having elasticity and viscosity are O-rings.

17. A capacitance type electromagnetic flowmeter according to claim 16, wherein grooves having the same circumferential length as said O-rings are provided in said casing member.

18. A capacitance type electromagnetic flowmeter according to claim 17, wherein one of said process piping and said protective rings is fixed to said casing member.

19. A capacitance type electromagnetic flowmeter comprising:

a flow tube which is arranged within a casing member and through which a fluid flows;

magnetic field applying means for applying a magnetic field to said fluid flow; and electrodes connected to said flow tube and kept out of contact with said fluid flow, wherein said magnetic field applying means are secured to said casing member and wherein said flow tube and said magnetic field applying means are kept out of contact with each other, and wherein the flow tube is in a non-contacting relationship with the casing member, wherein the non-contacting relationship of the casing member prevents external vibration from being transmitted to the flow tube.

20. A capacitance type electromagnetic flowmeter comprising:

a flow tube which is inserted in a gap in a process piping and through which a fluid flows;

support members for supporting said flow tube from said process piping;

magnetic field applying means for applying a magnetic field to said fluid flow; and electrodes connected to said flow tube and kept out of contact with said fluid flow, wherein members having elasticity and viscosity are provided between said flow tube and said support members so that said flow tube is supported to float relative to said support members, whereby said support members and said flow tube are insulated from each other in terms of vibration.

21. A capacitance type electromagnetic flowmeter according to claim 20, wherein the flow tube is in a non-contacting relationship with the casing member, wherein the non-contacting relationship of the flow tube and the casing member prevents external vibration from being transmitted to the flow tube.

22. A capacitance type electromagnetic flowmeter comprising:

a flow tube which is arranged in a casing member and through which a fluid flows;

magnetic field applying means for applying a magnetic field to said fluid flow; and electrodes connected to said flow tube and disposed out of contact with said fluid flow, wherein said flow tube is supported in said casing member in a non-contacting relationship thereto by means of members having elasticity and viscosity;

wherein said magnetic field applying means is secured to said casing member and kept out of contact with said flow tube;

wherein said members each have one of annular and cylindrical shapes;

wherein said flow tube is supported in said casing member in a liquid-tight and non-contact relationship therewith by means of at least two annular members so as to define a gap therebetween;

wherein said at least two annular members are O-rings; and wherein grooves having the same circumferential length as said annular members are provided in said casing member.

23. A capacitance type electromagnetic flowmeter comprising:

a flow tube which is inserted in a gap in a process piping and arranged in a casing member and through which a fluid flows;

magnetic field applying means for applying a magnetic field to said fluid flow; and electrodes connected to said flow tube and kept out of contact with said fluid flow, wherein members having elasticity and viscosity are arranged between said flow tube and said casing member and between said flow tube and said process piping so that said flow tube is kept out of contact with said casing member and with any member disposed in an adjacent relationship to said flow tube in an axial direction thereof;

further comprising protective rings provided between said process piping and said flow tube and between said casing member and said process piping;

wherein said magnetic field applying means is secured to said casing member and kept out of contact with said flow tube;

wherein said members each have one of annular and cylindrical shapes; and wherein said casing member, said flow tube and one of said protective rings and said process piping are kept out of contact with each other by means of at least two of said members having elasticity and viscosity so as to define gaps therebetween.

24. A capacitance type electromagnetic flowmeter according to claim 23, wherein said flow tube and said protective rings are held in a liquid-tight and non-contacting relationship with each other by means of at least two of said members having elasticity and viscosity to define spaces therebetween.

25. A capacitance type electromagnetic flowmeter according to claim 24, wherein said members having elasticity and viscosity are O-rings.

26. A capacitance type electromagnetic flowmeter according to claim 25, wherein grooves having the same circumferential length as said O-rings are provided in said casing member.

27. A capacitance type electromagnetic flowmeter according to claim 26, wherein one of said process piping and said protective rings is fixed to said casing member.

* * * * *

UNITED STATES PATENT AND TRADEMARK OFFICE
CERTIFICATE OF CORRECTION

PATENT NO. : 5,526,698

DATED : June 18, 1996

INVENTOR(S) : Yutaka Sakurai et al

It is certified that error appears in the above-identified patent and that said Letters Patent is hereby corrected as shown below:

Column 7, line 62, after "members" delete "are".

Signed and Sealed this

Eighth Day of October, 1996

Attest:

BRUCE LEHMAN

*Attesting Officer*   *Commissioner of Patents and Trademarks*